United States Patent

Stevanovic et al.

[11] Patent Number: 5,910,709
[45] Date of Patent: Jun. 8, 1999

[54] FLORESCENT LAMP BALLAST CONTROL FOR ZERO -VOLTAGE SWITCHING OPERATION OVER WIDE INPUT VOLTAGE RANGE AND OVER VOLTAGE PROTECTION

[75] Inventors: Ljubisa Dragoljub Stevanovic, Clifton Park; Robert Louis Steigerwald, Burnt Hills; Mustansir Hussainy Kheraluwala, Schenectady, all of N.Y.

[73] Assignee: General Electric Company, Schenectady, N.Y.

[21] Appl. No.: 08/870,205

[22] Filed: Jun. 6, 1997

Related U.S. Application Data

[63] Continuation of application No. 08/578,729, Dec. 26, 1995, abandoned.

[51] Int. Cl.⁶ .................................................. H05B 37/02
[52] U.S. Cl. ........................ 315/225; 315/119; 315/307
[58] Field of Search .................................. 315/225, 224, 315/209 R, 291, 307, 308, DIG. 5, DIG. 7, DIG. 4, 119

[56] References Cited

U.S. PATENT DOCUMENTS

| | | | |
|---|---|---|---|
| 4,503,363 | 3/1985 | Nilssen ..................................... | 315/225 |
| 4,538,095 | 8/1985 | Nilssen ..................................... | 315/244 |
| 4,616,158 | 10/1986 | Krummel et al. ........................ | 315/225 |
| 4,667,131 | 5/1987 | Nilssen ..................................... | 315/275 |
| 5,023,516 | 6/1991 | Ito et al. .................................. | 315/101 |
| 5,233,273 | 8/1993 | Waki et al. ............................... | 315/224 |

FOREIGN PATENT DOCUMENTS

| | | |
|---|---|---|
| 0338109 | 10/1989 | European Pat. Off. . |
| 603017A1 | 2/1996 | European Pat. Off. . |

*Primary Examiner*—Don Wong
*Assistant Examiner*—David H. Vu
*Attorney, Agent, or Firm*—Jill M. Breedlove; Marvin Snyder

[57] ABSTRACT

A ballast system for at least one dimmable fluorescent lamp includes a resonant switching inverter and a controller which controls the inverter to operate above resonance during starting and normal running operation. After a start delay timer allows time for the lamp filaments to heat up, the controller provides control signals to a gate driver to drive the switching devices of the switching inverter initially at a relatively high frequency and then reduces the frequency until a sufficiently high voltage is reached to start the lamp. Once the lamp is started, the inverter is operated in its normal feedback mode. The ballast system further includes an overvoltage shutdown mechanism. During lamp starting, if either the output of the start delay timer is high or the output voltage is greater than a first overvoltage shutdown threshold, then an overvoltage shutdown timer is activated to shut down operation of the inverter for a predetermined overvoltage shutdown period. After the lamp has started, a second overvoltage shutdown threshold is activated which is lower than the first overvoltage threshold for avoiding operation of the inverter below resonance. Both the frequency and duty cycle of the output voltage from the switching inverter are variable to achieve a wide dimming range over a relatively narrow frequency range.

8 Claims, 2 Drawing Sheets

FLORESCENT LAMP BALLAST CONTROL FOR ZERO-VOLTAGE SWITCHING OPERATION OVER WIDE INPUT VOLTAGE RANGE AND OVER VOLTAGE PROTECTION

This application is a Continuation of application Ser. No. 08/578,729 filed Dec. 26, 1995, now abandoned.

FIELD OF THE INVENTION

The present invention relates generally to fluorescent lamps and, more particularly, to high-frequency electronic dimming ballasts therefor.

BACKGROUND OF THE INVENTION

Typical modern dimmable fluorescent lamp systems include a high-frequency resonant ballast inverter operating from a dc input voltage source and supplying approximately sinusoidal high-frequency ac current to the fluorescent lamp(s). The dc input voltage to the ballast is typically obtained by rectifying an ac utility voltage or, alternatively, directly from a dc source such as a battery. By operating the resonant ballast inverter above its natural resonance, the output characteristics of the inverter resemble an ideal ac current source, and the dimming function is achieved by increasing the inverter switching frequency which, in turn, reduces the lamp current. In addition to regulating light output of the lamp, the ballast inverter also provides high output voltage for starting the lamp(s) having an amplitude which is usually two to three times higher than the lamp voltage during normal operation.

To maximize efficiency, it is desirable to have zero-voltage switching (ZVS) operation of the inverter switching devices which greatly reduces switching losses. (ZVS is switching a device with zero voltage thereacross.) On the other hand, if the same resonant inverter is operated below resonance, ZVS operation is lost and the devices of the inverter are hard-switched, resulting in relatively high switching losses. Therefore, in high-frequency ballasts with a wide dimming range, i.e., 100% to about 1% full light output, it is desirable to enable ZVS operation throughout the entire dimming range. It is also desirable to maintain ZVS operation and the full dimming range with a wide input dc voltage range, e.g., two-to-one. Still further, it is desirable to achieve the aforementioned features over a relatively narrow switching frequency range in order to lower switching losses, reduce likelihood of interference with other equipment, and to reduce resonant switching stresses.

Accordingly, it is desirable to provide a control for a dimmable fluorescent lamp ballast which maintains operation above resonance over a wide dc input voltage range and throughout the entire dimming range, while maintaining a relatively narrow switching frequency range. In addition, because ballast inverter operation below resonance results in relatively high switching losses and could cause overheating and even failure of switching devices, it is desirable to have a protective feature for detecting and preventing prolonged operation of the ballast below resonance. The large amplitude of the output voltage waveform during starting is also potentially damaging to resonant components at the output of the ballast inverter such that some type of overvoltage protection is desirable. Such overvoltage protection should not interfere with normal starting and running operation of the ballast, but should prevent the output voltage from exceeding a predetermined value by shutting down operation of the inverter. (It should be noted that during ZVS operation, the resonant ballast inverter is immune to a short circuit condition at the output, making it unnecessary to protect a system operating with ZVS against this failure mode.)

SUMMARY OF THE INVENTION

A ballast system for at least one dimmable fluorescent lamp comprises a resonant switching inverter and a controller therefor which controls the inverter to operate above resonance during starting and normal running operation. The controller preferably comprises a pulse width modulation (PWM) regulator. After a start delay timer allows time for the lamp filaments to heat up, the PWM regulator provides control signals to a gate driver to drive the switching devices of the switching inverter initially at a relatively high frequency (i.e., higher than a normal operating frequency for the lamp) and then reduces the frequency until a sufficiently high voltage is reached to start the lamp. Once the lamp is started, the inverter is operated in its normal feedback mode to feed back sensed lamp current signals to the PWM regulator which compares the sensed lamp current signals with a commanded current signal.

The ballast system further comprises an overvoltage shutdown mechanism with two different threshold levels. During lamp starting, if the output voltage is greater than a first overvoltage shutdown threshold, then an overvoltage shutdown timer is activated to shut down operation of the inverter for a predetermined overvoltage shutdown period. After the lamp has started, a second overvoltage shutdown threshold is activated which is lower than the first overvoltage threshold for avoiding operation of the inverter below resonance.

The gate driver circuit control is operated to provide gating signals with a constant OFF-time, variable ON-time. In this way, both the frequency and duty cycle of the square wave voltage waveform at the input of the inverter resonant circuit are variable to achieve a wide dimming range over a relatively narrow frequency span. Advantageously, the narrow frequency range results in lower switching losses, a reduced likelihood of interference with other equipment, and reduced stresses on resonant circuit components.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
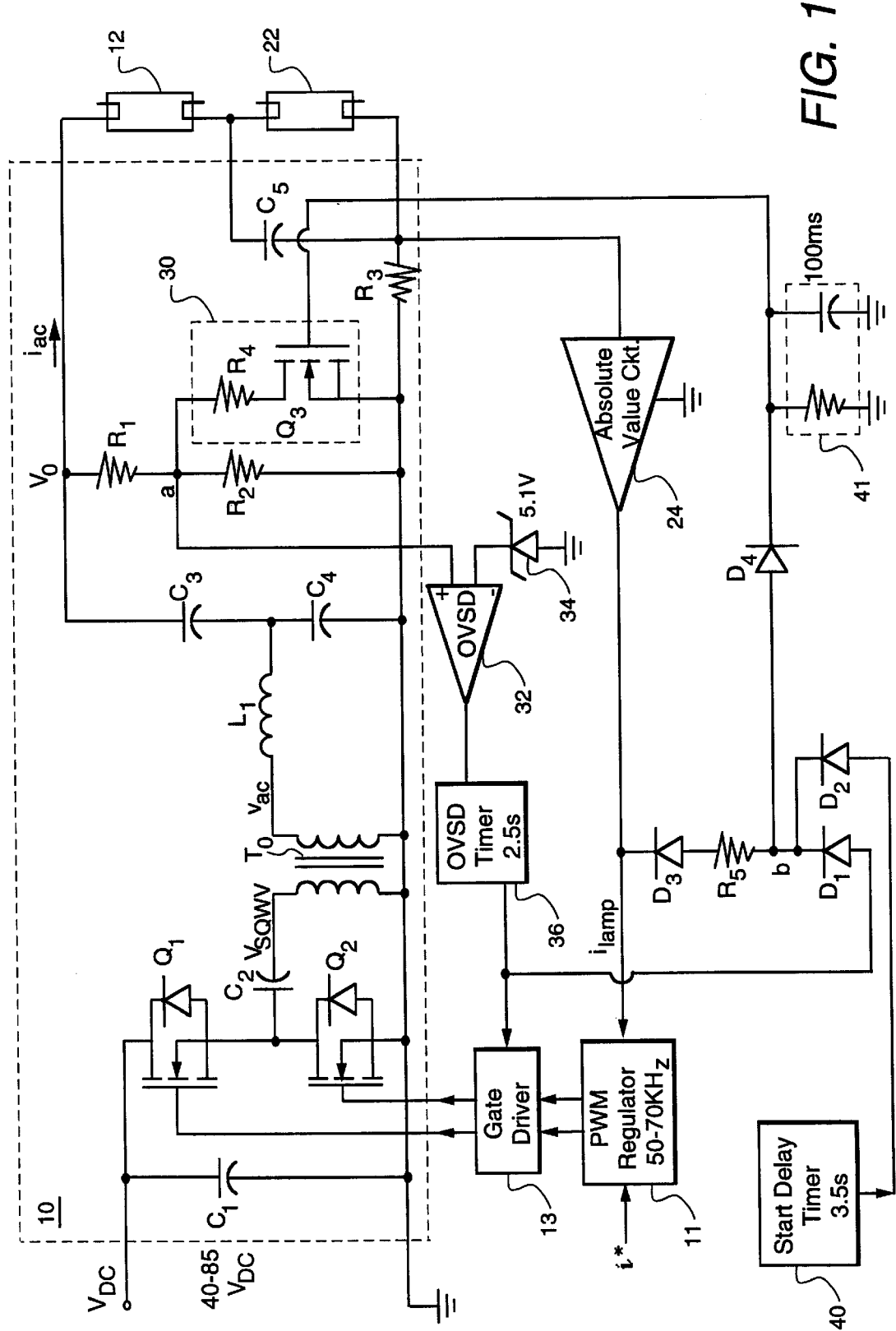
FIG. 1 schematically illustrates a ballast system in accordance with the present invention.

FIG. 1 schematically illustrates a fluorescent lamp system in accordance with the present invention. By way of example, FIG. 1 illustrates a two-lamp system with fluorescent lamps 12 and 22. It is to be understood, however, that the present invention applies to fluorescent lamp systems having one or more lamps. The ballast inverter 10 is shown schematically as comprising a conventional half-bridge resonant switching ballast configuration for a fluorescent lamp. A capacitor C1, typically electrolytic, is coupled across the ballast input in order to provide a rectified, filtered dc voltage to a half-bridge connection of switching devices Q1 and Q2. This input is typically obtained from rectifying an ac utility voltage. Alternatively, it can be obtained directly from a dc source such as a battery. A PWM regulator 11 provides gate drive signals to gate driver circuit 13 for alternately switching devices Q1 and Q2 to provide bi-directional current flow through a resonant circuit, including an inductor L1 and a capacitor C4, which is shown as being coupled through an output transformer To and a capacitor C2 to the junction between the switching devices Q1 and Q2. The series-connected lamps 12 and 22 are connected across series-connected capacitors C3 and C4. The capacitor C3 is used to extend the dimming range of the ballast by changing the resonant characteristics of the resonant circuit after the lamp starts. A resistor R3 is provided as a current sensor for controlling the lamp dimming function in a manner well-known in the art. A starting capacitor C5 is connected between the junction joining the lamps and ground, which momentarily shorts the lamp 22 so that a higher voltage is applied to the lamp 12 for starting.

Figure 2:
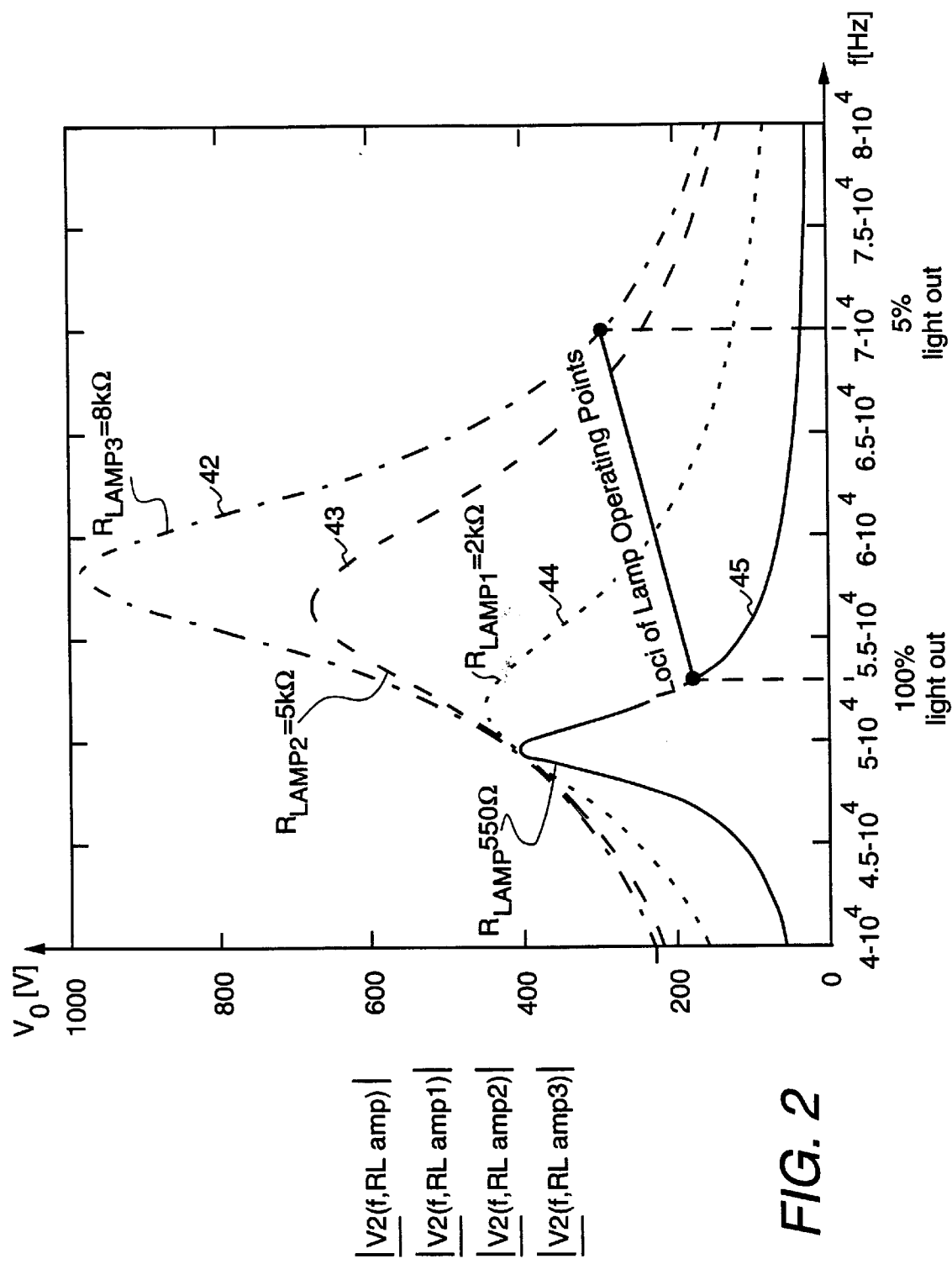
FIG. 2 graphically illustrates frequency response for a ballast system such as that of FIG. 1.

FIG. 2 shows a family of frequency response curves for an exemplary ballast inverter system such as that of FIG. 1. Each curve represents output voltage Vo as a function of frequency of input voltage $v_{ac}$ and with a total lamp resistance $R_{lamp}$ as a changed parameter. Input voltage amplitude was constant. To achieve high-efficiency operation, it is desirable to operate the lamp(s) during starting and running above the resonant frequency $f_r$, i.e., on the right side of the peak of the respective frequency response curve. Operation above the resonant frequency allows for ZVS of the active devices of the ballast inverter and hence higher efficiency.

It is important to note that the resonant frequency $f_r$ of the inverter shown in FIG. 1 changes with loading as can be seen by looking at the peaks of the resonant curves in FIG. 2. This is easy to understand by examining two extreme load cases in FIG. 1. During starting, before the lamps are ignited, the impedance of both lamps 12 and 22 is essentially infinite, and the self-resonant frequency of the resonant inverter is approximately $$f_{r1} = \frac{1}{2\pi\sqrt{L1C4}}.$$

When the lamps are illuminated and at full brightness, the impedance of both lamps is much lower than impedance of the capacitor C3 at the operating frequency, and the self-resonant frequency of the resonant inverter can be approximated as $$f_{r2} = \frac{1}{2\pi\sqrt{L1(C4+C3)}}.$$

As the lamps are dimmed, their impedance increases and the loading of the resonant inverter changes, also changing its resonant frequency. This is clearly shown in FIG. 2, where the load resistance parameter is changed from $R_{lamp}$=550Ω, representing the resistance of two lamps at full brightness, to $R_{lamp3}$=8 kΩ, which is approximately the resistance of two lamps at 5% brightness.

In accordance with the present invention, a high-frequency electronic ballast system for driving one or more fluorescent lamps includes a starting control for starting the lamp(s) at a frequency above the resonant frequency $f_{r2}$, an overvoltage protection mechanism during both starting and normal operation, and a dual voltage control for operating the lamp over a wide dimming range.

In operation of the ballast system of FIG. 1, lamp current $i_{ac}$ is sensed by the sensing resistor R3 and is provided to the PWM regulator via an absolute value circuit 24. (Although the resistor R3 is provided for sensing lamp current, any other device suitable for providing a signal indicative of light output may be employed.) An overvoltage protection circuit 30 comprises a switching device Q3 in series with a resistor R4 connected between the junction a joining resistors R1 and R2 and ground. The junction a is connected to the non-inverting input of an overvoltage shutdown (OVSD) comparator 32. The inverting input of the comparator 32 is connected to a Zener diode 34. The output of the comparator 32 is provided as an input to an overvoltage shutdown timer 36 which in turn provides an input to the gate driver circuit 13. The output of the timer 36 is also provided to the PWM regulator 11 via the series connection of diodes D1 and D3 and a resistor R5. The output of a start delay timer 40 is also provided as an input to the PWM regulator 11 via diodes D2 and D3 and the resistor R5. The cathodes of diodes D1 and D2 are connected together at a junction b which is coupled to the gate of the switching device Q3 via a diode D4 and an RC delay circuit 41.

To start the lamps, the capacitor C5 momentarily shorts the lamp 22 so that a higher voltage is applied to the other lamp 12 for starting. In addition, the start delay timer 40 delays starting the lamps until after the start delay timer 40 times out in order to allow the lamp filaments (which are supplied by a separate power supply (not shown)) to heat up before actually starting the lamps so that minimum sputtering of the filament emission mix occurs as the lamp discharge current begins to flow. FIG. 1 illustrates an exemplary start delay timer which provides an approximately 3.5 second time delay.

The PWM regulator 11 is operated to start at a predetermined relatively high frequency, i.e., higher than the open circuit resonant frequency $f_{r2}$, and "sweep down" through lower frequencies causing the output voltage Vo to build up as the peak of the resonant curve is approached (see resonant curve 42 of FIG. 2). When the voltage Vo is high enough to break down the discharge into the initial visible stages of ionization (this starting voltage amplitude is usually between 400–700V for a two-lamp ballast, depending on the ambient temperature), the discharge current is established. Such operation may be explained graphically with reference to FIG. 2 wherein operation moves from a curve (e.g., 42) representing highly unloaded, i.e., the high impedance case before the lamps are started, to operation on a loaded curve (e.g., 43, 44, 45) where the lamps are running. This can also be seen by looking at the curve 46 of FIG. 2 which approximately shows the loci of all lamp operating points from full light output (operating point at 53 kHz) to approximately 5% light output (at 70 kHz). Each operating point on the curve 46 is determined by intersection of the inverter output characteristic (resonant circuit frequency response) for that particular output load (curves 42 through 45) and the lamp voltage-current characteristic (not shown). It is important to note that during both starting and running operation throughout the entire dimming range, the loci of lamp operating points always remain on the right-hand side of the resonance of the corresponding resonant curve (42 through 45), resulting in above resonance operation of the ballast inverter, hence allowing for ZVS.

The ballast system according to the present invention also comprises an overvoltage shutdown mechanism including a circuit comprising the switching device Q3 and resistor R4. The device Q3 is initially on because the output of the start delay timer is high. The voltage at junction a, i.e., the output of the R1–R2 voltage divider, is provided to the comparator 32 to determine if the output voltage Vo is greater than a first overvoltage threshold $V_{OVSD1}$. If so, then the overvoltage shutdown timer 36 is activated to turn off the switching devices of the ballast inverter 10 via the gate driver 13 for an overvoltage shutdown period, e.g., shown in FIG. 1 as being 2.5 seconds. After the overvoltage shutdown period, the PWM regulator starts sweeping down again from the initial predetermined high frequency to start the lamps as described hereinabove.

Hence, if either Vo (as sensed by the voltage divider R1 and R2 in parallel with R4) is greater than the overvoltage shutdown threshold voltage or the start delay timer output signal is high, then device Q3 is on and the lamp current sensed by resistor R3 is overridden through the diode-OR arrangement of diodes D1 and D2, such that the PWM regulator 11 operates to sweep down through the frequency range as described hereinabove.

As an additional protective feature of the overvoltage shutdown scheme, the ballast system according to the present invention distinguishes between operation above the resonant frequency and operation below the resonant frequency. In particular, there is a second overvoltage shutdown voltage threshold $V_{OVSD2}$ which is lower than the first overvoltage shutdown voltage threshold $V_{OVSD1}$, i.e., $V_{OVSD2} < V_{OVSD1}$. The lower threshold $V_{OVSD2}$ is activated only after the lamps are on and running normally by turning off Q3, thus increasing the gain of the voltage divider (a larger fraction of Vo is now fed to comparator 32 via the R1–R2 voltage divider). The reason two threshold levels are needed is that the upper threshold $V_{OVSD1}$ is not low enough to prevent lamp operation below resonance. For example, if a lamp were to fail during running operation, then the output voltage would increase but not enough to trip the first overvoltage level $V_{OVSD1}$. However, with the second overvoltage threshold $V_{OVSD2}$ enabled after a startup interval, once either of the lamps fails, the output voltage reaches the second overvoltage threshold, activating the overvoltage shutdown timer 36 and the gate driver 13 is shut down and the starting process begins again. Otherwise, without this additional protective feature afforded by the second overvoltage threshold, the control, which would be operating below resonance, would seek to raise the lamp current by lowering the frequency and thus would stay below resonance so that ZVS would not be possible, losses would be high and there would be a danger of damaging the inverter switching devices.

After the lamps start such that the start delay timer output is low and the overvoltage shutdown timer output is low, the ballast system operates in its normal feedback mode, i.e., sensing the lamp current with the resistor R3 and providing the lamp current as an input through the absolute value circuit 24 to the PWM regulator 11. Note that once the lamps have been started, the output of the overvoltage shutdown comparator 32 does not go low until after a time delay determined by the RC circuit 41 which may be on the order of, for example, 100 ms to ensure that the lamps are on before the second overvoltage threshold is activated.

During normal running operation, the PWM control scheme implemented in this ballast inverter design has a two-fold effect on the output voltage Vo. In particular, the gate driver 13 is controlled by the PWM regulator 11 to provide a constant OFF-time for the inverter switching devices Q1 and Q2, but to provide a variable ON-time. Suitable PWM regulators 11 are, for example, devices numbered UCX862 and UCX864 manufactured by Unitrode Corporation. By keeping the OFF-time constant and varying the ON-time for the inverter switching devices, both the frequency and duty ratio of the squarewave voltage $V_{SQWV}$ at the primary of transformer To are varied. The variation in switching frequency affects the ballast inverter output voltage Vo as shown in FIG. 2. The variation of duty ratio of the ac voltage $V_{SQWV}$ has an added influence on the inverter output voltage Vo. At the minimum operating frequency of the ballast inverter, the PWM regulator is set up to operate with approximately equal ON-time and OFF-time, resulting in 50% duty ratio of switching devices Q1 and Q2. This makes the amplitude $V_{ac1}$ of the fundamental component of the $V_{SQWV}$ voltage highest for a given dc input voltage $V_{DC}$. When the lamps are dimmed, the ballast inverter frequency is increased by reducing the ON-time of the PWM regulator, and the duty ratio of the two switching devices Q1 and Q2 is no longer 50%. (The duty ratio of Q1 is lower than 50%, while the duty ratio of Q2 is higher than 50%.) As a result, the fundamental component $V_{ac1}$ of the voltage $V_{SQWV}$ has lower amplitude than at 50% duty ratio, all else being equal. Since the input voltage $v_{ac}$ to the resonant circuit of FIG. 1 is proportional to the fundamental component $V_{ac1}$ of the transformer primary voltage $V_{SQWV}$ (the constant of proportionality being the transformer turns ratio), it is apparent that a change in the duty ratio of the switching devices directly affects the amplitude of the transformer secondary voltage $v_{ac}$ and output voltage Vo. The combined effect of the frequency variation and the duty ratio variation is control of the output voltage to achieve full dimming range over a relatively narrow frequency range. Advantageously, the narrow frequency range results in lower switching losses, reduced likelihood of interference with other equipment, and reduced resonant component stresses. In addition, operation in the ZVS mode for any lamp operating mode (including lamp failures) is guaranteed by virtue of the dual overvoltage threshold level circuitry.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A ballast system for at least one dimmable fluorescent lamp, comprising:

a ballast inverter for driving said at least one dimmable fluorescent lamp to provide light output, said ballast inverter comprising a resonant switching inverter for providing an output voltage for operating said lamp;

a gate driver circuit for providing gating signals to said resonant switching inverter over a frequency range;

an inverter controller for providing control signals to said gate driver circuit for controlling resonant operation of said ballast inverter to start the lamp by sweeping through an operating frequency range beginning with a predetermined relatively high initial frequency and continuously reducing the operating frequency until said output voltage is sufficiently high to start said lamp, said inverter controller providing control signals to said gate driver circuit for maintaining operation above resonance after starting the lamp such that said ballast inverter operates in a substantially zero-voltage switching mode; and an overvoltage shutdown circuit coupled to said lamp for shutting down said inverter for an overvoltage shutdown period whenever said output voltage exceeds an overvoltage shutdown threshold, said inverter controller again providing control signals for sweeping through the operating frequency range beginning with the predetermined relatively high initial frequency to start the lamp after the overvoltage shutdown period.

2. The ballast system of claim 1 wherein said overvoltage shutdown threshold comprises a first overvoltage shutdown threshold during lamp starting and a second overvoltage shutdown threshold during normal running operation, said first overvoltage shutdown threshold being greater than said second overvoltage shutdown threshold in order to enable lamp starting and to avoid operation below resonance.

3. The ballast system of claim 1, further comprising a sensing device for providing a signal indicative of light output from said lamp.

4. The ballast system of claim 3 wherein said sensing device comprises a current sensor for sensing current in said lamp.

5. The ballast system of claim 4 wherein said inverter controller comprises a PWM regulator circuit for receiving an input current command and comparing the sensed lamp current therewith.

6. The ballast system of claim 1, further comprising a start delay timer circuit for delaying starting of said lamp until sufficient time has elapsed to allow for lamp filament heating.

7. The ballast system of claim 1 wherein said overvoltage shutdown circuit comprises a switching device for changing the gain of the output voltage sensing circuit.

8. The ballast system of claim 1 wherein the OFF-time of said gating signals is constant, the ON-time of said gating signals being variable in order to vary the frequency and amplitude of the output voltage from said switching inverter.

* * * * *